Feb. 23, 1937.  W. S. BREMER  2,071,318
COOKING UTENSIL
Filed May 20, 1935
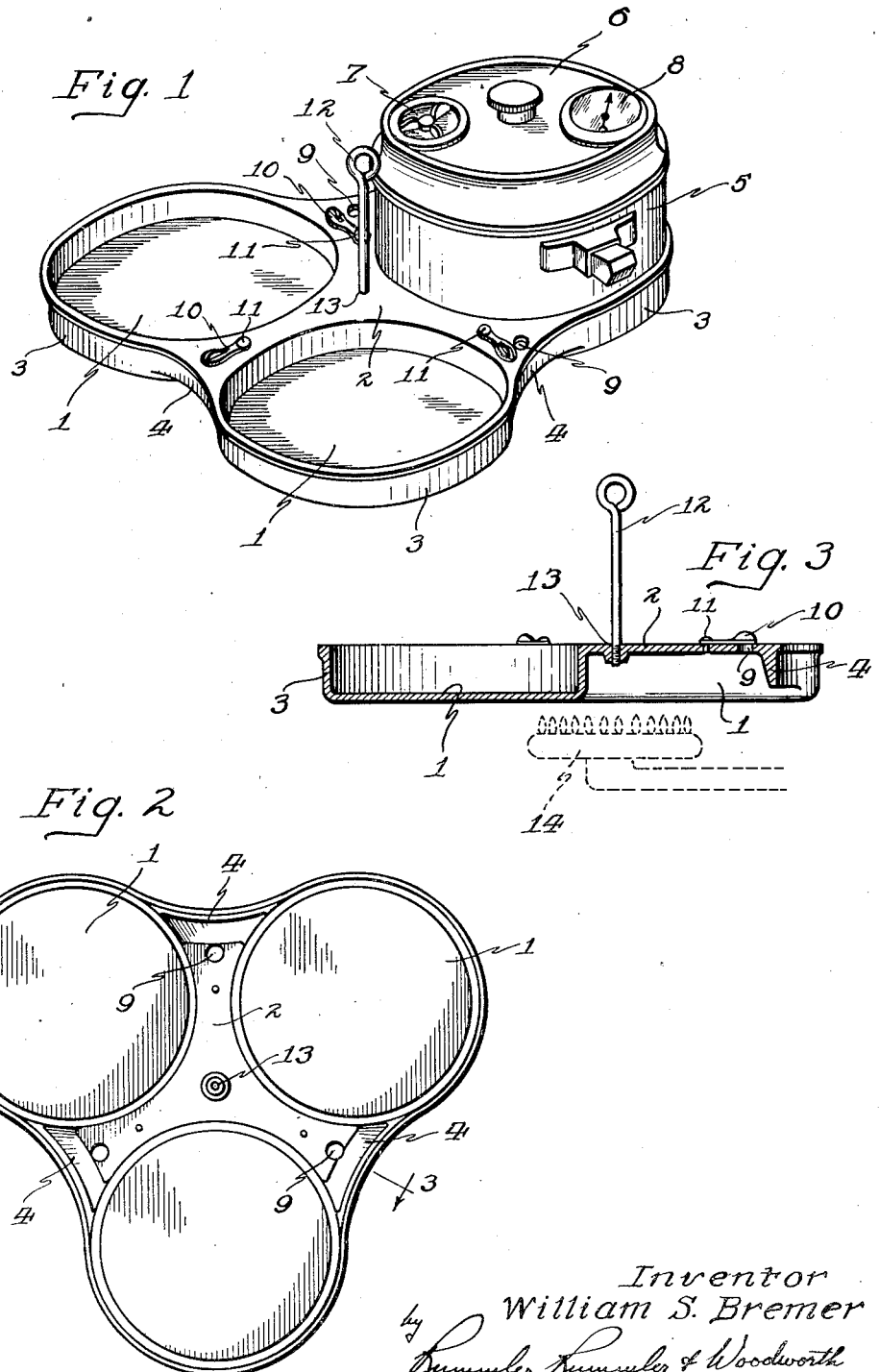
Inventor
William S. Bremer Patented Feb. 23, 1937

2,071,318

UNITED STATES PATENT OFFICE 2,071,318

COOKING UTENSIL

William S. Bremer, New Washington, Ohio

Application May 20, 1935, Serial No. 22,385

3 Claims. (Cl. 53—1)

This invention relates to cooking utensils and particularly to cooking plates arranged for the heating of a plurality of containers by means of a single heating element.

The main objects of this invention are to provide an improved cooking plate for supporting a group of cooking utensils over a single heating element and in such a way that each utensil may be affected in the same way by the said heating element; to provide such a device arranged to support a plurality of cooking utensils in fixed relation to each other; to provide such a device arranged to more effectively trap and distribute the heat derived from a single heating element; and to provide such a device arranged to selectively vary the relative proportion of the heat from a single element that is distributed to each of a plurality of grouped cooking utensils.

A specific embodiment of this invention is shown in the accompanying drawing, in which:

Fig. 1 is a perspective view of a cooking plate with a container utensil positioned thereupon.

Fig. 2 is a bottom plan view of the same showing the means for trapping the heat of a single heating element and other means for controlling the distribution of such heat, and Fig. 3 is a sectional view of the same as taken on line 3—3 of Fig. 2 showing also, in dotted outline, a single heating element positioned beneath the device.

In the form shown in the drawing my improved cooking device comprises a plate-like element made up of three circular pan-like portions which have substantially vertical side walls joined together at their adjacent top margins by a web 2 to form a group having a trefoil outline in plan, the side walls 3 of the several pans 1 being connected by flanges 4 which extend between the pans 1 adjacent the outer periphery of the group as a whole. The device is preferably made of aluminum, or other suitable material, and formed as a single unit.

As shown in Figures 1 and 3 the flanges 4 serve to provide an enclosure or trap beneath the web 2 and centrally between the several pans 1, which are spaced apart somewhat in the trefoil group arrangement. The flanges 4 as shown are of less depth than the side walls 3 of the pans 1 and depend from the web 2 so as to leave a narrow space or opening between the lower edge of the flange 4 and the bottoms of the pans 1 for the escape of heated gases or heat transferring medium after the same has given up a portion of its heat into the body of the utensil and upon thus being partially cooled has dropped downwardly away from web 2 toward the lower margins of the flanges 4.

As shown in Fig. 1 containers such as the container or kettle 5, of circular shape to fit into the pans 1, are positioned therein and securely held in fixed relation to each other. These containers may comprise, as shown in Fig. 1, a circular body having vertical side walls and a removable cover 6 which has an adjustable vent 7 and which also has mounted thereon a temperature indicator 8.

As shown the web 2 is provided with a plurality of apertures 9 located near the margins of the device inside of the flanges 4 and between each pair of the pans 1. Swingable closures or gates 10 are provided for each of the apertures 9 and each of these closures is pivoted as at 11 so as to be shiftable to open or close the said apertures 9. Also as shown in Figs. 1 and 3 the device is provided with a vertical handle 12 which may be threaded into a tapped opening, as at 13, in the center of the web 2.

In operation the device is positioned centrally over a heating element as shown in Fig. 3 wherein a gas burner 14 is indicated in dotted outline, the device resting upon a grill, not shown, but ordinarily provided over the burners or heating elements of a cooking stove. The containers 5 are then placed in the pans 1 and the heat supplied by the heating element travels upwardly into the pocket or trap formed between the pans 1 by the web 2, the inner or adjacent portions of the walls 3 and the flanges 4, and, when the apertures 9 are closed, such heat is equally distributed to the body of each of the pans 1 and thence to the respective containers 5.

When it is desired to regulate the proportion of heat being transferred to each of the several pans 1 and thus to the containers 5, the closures or gates 10 for the apertures 9 are swung pivotally so as to partially or entirely uncover the said apertures, thus directing the flow of heated gases or heating medium from the heating element so that more or less of the same will come in contact with selected ones of the pans 1. For example, as shown in Fig. 1, if it is desired that a major part of the heat be transmitted to the pan holding the container 5 then the two adjacent apertures 9 will be wholly uncovered so that a constant flow of a greater part of the heated gases from the heating element will pass toward the side walls 3 of the respective pan and out through the uncovered apertures 9, thus transferring the major portion of the heat from the heating element to the pan located intermediate the two open apertures 9.

Should it be desired to heat any two of the pans 1 to a greater degree than the remaining pan, then the aperture 9 between the selected pans which are to receive the greatest amount of heat will be opened, thus causing the heated gases to flow mainly around the two selected pans. In this manner and by observing the temperature indicators 8 in the covers 6 of the containers, and by adjusting the extent to which the apertures 9 are opened, the flow of heated gases trapped in the space between the pan walls and the flanges 4 can be so controlled that the desired amount of heat will be transferred to selected pans in substantially the desired proportions.

The particular advantages of this invention are the arrangement of flanges whereby the gases carrying the heat from the heating element are more effectively trapped so that it may give up the greatest amount of heat before spilling to the surrounding atmosphere, thus increasing the efficiency of the device, and enhancing the economy of its operation; and the arrangement whereby the flow of gases or heating medium may be controlled so as to regulate differentially the amount that each of several grouped cooking containers may be heated.

Although but one specific embodiment of this invention is herein shown and described, it will be understood that details of the structure shown may be altered or omitted without departing from the spirit of this invention as defined by the following claims:

I claim:

1. A cooking plate comprising a plurality of spaced pan-like portions arranged in a symmetrical group and having upstanding side walls, a web extending between the adjacent portions of the upper margins of said side walls and joining said pan-like portions in said group, and flanges depending from the outer margins of said web and extending therealong between the said side walls, said flanges having less vertical depth than said side walls and their bottom edges spaced above the bottoms of said pan-like portions.

2. A cooking plate comprising a plurality of spaced pan-like portions arranged in a symmetrical group and having upstanding side walls, a web extending between the adjacent portions of the upper margins of said side walls and joining said pan-like portions in said group, flanges depending from the outer margins of said web and extending therealong between the said side walls, said flanges having less vertical depth than said side walls and their bottom edges spaced above the bottoms of said pan-like portions, said web having an aperture therethrough located adjacent each outer margin of said web between each pair of said pan-like portions, and movable closure members arranged to open and close said apertures selectively.

3. In a cooking utensil the combination with a plurality of individual kettles, of a cooking plate comprising a plurality of spaced pan-like portions having substantially vertical side walls and arranged to receive and hold said kettles one in each of said pan-like portions, said pan-like portions being arranged in a symmetrical group about a common center, a web extending between the adjacent upper margins of said side walls and joining the said pan-like portions, flanges depending from the outer margins of said web and extending therealong between the said side walls, said web having apertures therethrough located adjacent the outer margins of said web, and closure means for said apertures arranged to open and close said apertures selectively.

WILLIAM S. BREMER.